(12) United States Patent
Aab et al.

(10) Patent No.: US 8,678,682 B2
(45) Date of Patent: Mar. 25, 2014

(54) DEVICE FOR CONTROLLING A CENTRAL SHUTTER

(75) Inventors: Konstantin Aab, Edermünde-Grifte (DE); Stefan Uwe Best, Solms-Oberndorf (DE)

(73) Assignee: Leica Camera AG, Solms (DE)

( * ) Notice: Subject to any disclaimer, the term of this patent is extended or adjusted under 35 U.S.C. 154(b) by 43 days.

(21) Appl. No.: 13/575,184

(22) PCT Filed: Jan. 18, 2011

(86) PCT No.: PCT/EP2011/000185
§ 371 (c)(1),
(2), (4) Date: Jul. 25, 2012

(87) PCT Pub. No.: WO2011/091960
PCT Pub. Date: Aug. 4, 2011

(65) Prior Publication Data
US 2012/0292151 A1    Nov. 22, 2012

(30) Foreign Application Priority Data

Jan. 28, 2010  (DE) .......................... 10 2010 005 921
May 25, 2010  (DE) .......................... 10 2010 021 478

(51) Int. Cl.
*G03B 9/18*  (2006.01)

(52) U.S. Cl.
USPC ............................. 396/467; 396/468; 396/493

(58) Field of Classification Search
USPC .................................. 396/465–468, 493, 502
See application file for complete search history.

(56) References Cited

U.S. PATENT DOCUMENTS

| 2,269,400 | A |   | 1/1942  | Steiner |          |
|-----------|---|---|---------|---------|----------|
| 2,492,723 | A |   | 12/1949 | Willcox |          |
| 2,906,186 | A | * | 9/1959  | Gorey   | 396/477  |
| 3,257,921 | A |   | 6/1966  | Gorey   |          |
| 3,492,931 | A | * | 2/1970  | Racki   | 396/463  |
| 3,741,091 | A | * | 6/1973  | Ohmura  | 396/251  |
| 3,810,224 | A | * | 5/1974  | Kitai et al. | 396/493 |
| 4,494,846 | A |   | 1/1985  | Kurosu et al. |    |
| 5,915,141 | A | * | 6/1999  | Ebe     | 396/470  |
| 7,104,707 | B2| * | 9/2006  | Miyawaki | 396/449 |
| 7,670,069 | B2| * | 3/2010  | Suzuki et al. | 396/463 |
| 8,511,918 | B2| * | 8/2013  | Aab     | 396/497  |

FOREIGN PATENT DOCUMENTS

DE         969 694         7/1958
DE   10 2009 020 287 A1   11/2010

* cited by examiner

*Primary Examiner* — Clayton E Laballe
*Assistant Examiner* — Leon W Rhodes, Jr.
(74) *Attorney, Agent, or Firm* — Foley & Lardner LLP

(57) ABSTRACT

A device for controlling a central shutter, in which a plurality of shutter leaves (3) are mounted on a circularly annular leaf carrier (1) such that they can be pivoted on a pivoting arm (4), and in which, as actuating device for the pivoting movement of the shutter leaves (3), an annular cam plate (5) is mounted on the leaf carrier (1) concentrically with respect to the shutter opening (2), such that it can be rotated continuously in one direction, it being possible for the rotation of the cam plate (5) to be blocked by mechanical engagement into a cam trough (8) in front of an actuating flank (6) of a cam, is distinguished by the fact that, for mechanical blocking purposes, there is a push rod (9, 10) of a solenoid, which push rod (9, 10) can be moved perpendicularly with respect to the plane of the cam plate (5).

13 Claims, 4 Drawing Sheets

DEVICE FOR CONTROLLING A CENTRAL SHUTTER

Figure 1:
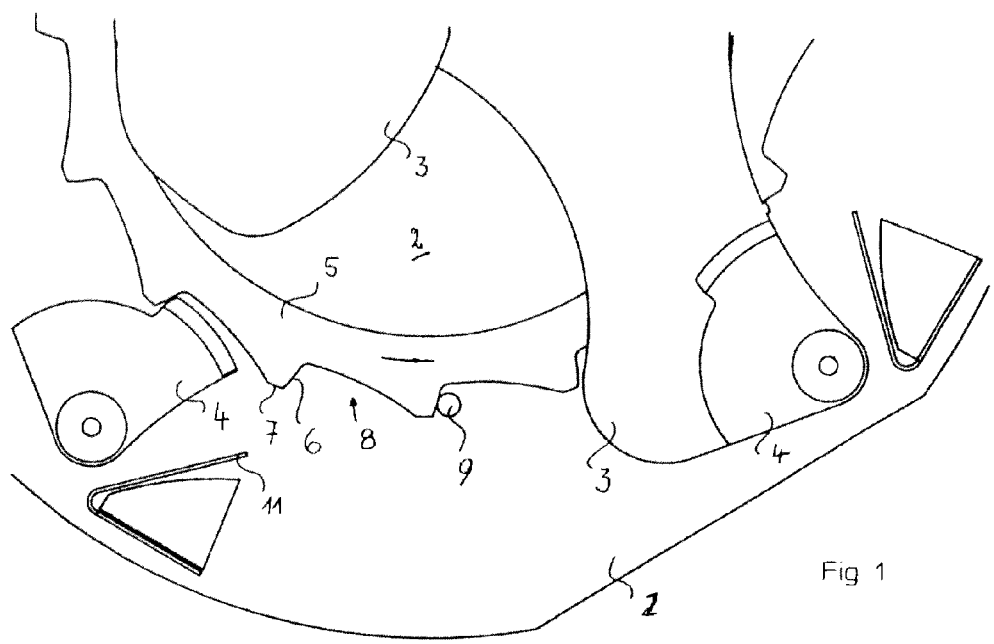

The prior patent application 10 2009 020 287.0 from the applicant has disclosed a photographic central shutter, in which a plurality of shutter leaves are mounted on an annular leaf carrier.

The shutter leaves are fastened to the outer base of a cup-shaped pivoting arm. The pivot pin of the shutter leaves is inserted into the cup-shaped opening of the pivoting arm. An actuating device for triggering the pivoting movement acts on the outer cup edge of each pivoting arm.

A helical spring is placed into the pivoting arm around the pivot pin of the pivoting arm, one arm of said helical spring being fixed on the pivoting arm and the other free arm of said helical spring being fastened to the leaf carrier. The helical spring is stressed when the shutter leaves pivot out of the closed position of the central shutter into the open position.

An annular cam plate is provided as actuating device for the pivoting movement. During the rotation of the cam plate around the shutter opening, the cams raise up the individual pivoting arm in each case via a relatively steep actuating flank, to produce a rotation about its pivot pin. The complete opening of the central shutter is achieved when the pivoting arms of the shutter leaves in each case rest on a cam peak under the stressing force of the helical spring. In this position, the rotation of the cam plate can be stopped or can be perpetuated continuously. After the holding function has ended, the pivoting arm falls on account of the stressing force of the helical spring from the cam peak into a cam trough, that is to say back into the closed position of the central shutter. The rotation of the cam plate can also be stopped in this position until the triggering of the next shutter opening.

In order to stop the cam plate, two-armed catches are provided which are likewise mounted pivotably on the leaf carrier. With one of their arms, the catches fall into the troughs between the cams and block the further rotation of the cam plate by way of their end side by making contact with a cam flank. With the aid of an electrically controlled attraction and repulsion magnet which acts on the other end of the catch, the catches are pulled out of the holding function or are pushed into it.

In order to drive the cam plate, a spring force store is provided which, after previous stressing, brings about a continuous, rapid rotation of the cam plate in one direction. The bearing forces of the catches on the cam flanks are very high in accordance with the stored spring forces. Correspondingly strong magnetic forces are required to release the catches.

The friction forces which occur during release of the catches lead to irregular hesitations during the release of the cam plate and therefore to imprecise shutter control. The levers of the catches have to travel relatively great paths to release the cam plate. The setting of short shutter times is made difficult as a result or is even restricted. In order to generate the necessary strong magnetic forces, high currents are required which strain the capacities of the electric energy accumulators and limit their service lives.

The invention was therefore based on making more exact, more rapid and energy-saving shutter control possible in the case of the described central shutter.

According to the invention, this object is achieved by the fact that, instead of the catches which can be pivoted in the plane of the cam plate, a solenoid is provided with a push rod which is moved perpendicularly with respect to the plane of the cam plate. In order to block the cam plate, the push rod is pushed into the cam troughs. Only very short paths are required for the stroke of the push rod, in order to effectively block the cams which lie with a relatively low thickness on the cam plate. The solenoid can be configured in such a way that its push rod projects outwardly out of the magnet in the rest position without electric supply, as a result of a mechanical spring, and is pulled in electromagnetically only in order to release the blocking action. The switching times of solenoids of this type are very short. The energy requirement is low.

It is disadvantageous that the usually cylindrical metal push rod of the solenoid can damage the cam flank which is composed of plastic, when coming into contact with the cam to be blocked. Since the cam flank at another point of the cam plate also serves to drive the pivoting arm of the aperture leaves, irregular leaf movements can occur. Moreover, the running times brought about by the mechanical spring force store between cam troughs which follow one another can be adjusted very precisely by way of the electric control times of the solenoid, in order to avoid damage of the cam plate by a retracting push rod.

In one development of the invention, a flat, toothed disk is therefore mounted rotatably on the leaf carrier. The tooth flanks are adapted to the steep actuating flanks of the cam plate. The tooth spacing is selected in such a way that, after the ejection of a tooth flank by the push of the actuating flank upon rotation of the cam plate, the next tooth is turned into the region of a cam trough. The toothed disk can be produced from metal. Since, during a rotation, its tooth flanks only slide along the actuating flanks of the cam plate and full surface contact occurs during the bearing of the following actuating flank, mutual damage is avoided. Without additional inhibiting means, the toothed disk is corotated during a rotation of the cam plate.

In order to stop the cam plate, solenoids are in turn arranged on the leaf carrier, the push rods of which solenoids can be retracted and extended from/into tooth gaps of the toothed disk perpendicularly with respect to the plane of the leaf carrier. The push rods are positioned in such a way that the toothed disk and therefore the cam plate can be blocked in rotational positions, in which the pivoting arms of the shutter leaves either lie in a cam trough (closed position) or rest on a cam peak (open position).

The advantage of this development consists in the fact that plastic surfaces and metal surfaces slide along one another in the region of the cam plate, whereas metal surfaces interact in the region of the push rods, which metal surfaces are less susceptible to damage in the case of impacts.

In a further embodiment, the toothed disk is replaced by a vane disk which is likewise produced from metal and the vanes of which are in engagement with the cams of the cam plate in the same way as the teeth of the toothed disk. In order to block the vanes of the vane disk, single-arm ratchet levers are provided which are mounted pivotably on the leaf carrier and are provided with a catch head. The ratchet levers bear on one side against a flat spring which, as a result of its prestress, presses the catch heads in the direction of the gaps between the vanes of the vane disk.

One of the ratchet levers is positioned in such a way that its end of the catch head stops a vane, the pivoting of the catch head out of the vane gap being prevented by a push rod of a solenoid, which push rod projects perpendicularly out of the leaf carrier. After retraction of the push rod into the solenoid, the blocked vane slides off the end of the catch head and presses the ratchet lever away from the vane disk counter to the action of the flat spring. As soon as the previously blocked vane has run past the head of the ratchet lever, the catch head is pressed into the following vane gap again under the action of the stressed flat spring and is secured against pivoting out by renewed extension of the push rod.

Another ratchet lever is positioned in such a way that the chin of the catch head prevents further rotation of a vane of the vane disk, which chin is pivoted into a gap between the vanes. Here too, pivoting of the ratchet lever out of the vane gap is blocked by a push rod of a solenoid, which push rod projects perpendicularly out of the leaf carrier. After retraction of the push rod into the solenoid, the blocked vane slides along the chin of the catch head beyond the catch head and presses the ratchet lever away from the vane disk counter to the action of the flat spring. As soon as the previously blocked vane has run past the catch head, the catch head is pressed into a vane gap again and is secured by renewed extension of the push rod in the position which is suitable for contact with a vane.

The advantage of the ratchet levers which are connected in between consists in the fact that the necessary holding forces at the push rods are stepped down according to the lever length of the ratchet lever. The electric energy which is to be applied in order to retract the push rods is therefore reduced once again. Moreover, damage of the component to be blocked caused by faulty control of the push rod can occur only on a surface which is not associated with the control of the cam plate.

During the retraction of the push rod by the solenoid, friction forces have to be overcome between the blocked component which is contact and the push rod. The friction forces are dependent on the material and depend on the contact pressure of the blocked component. Moreover, the transition from the stronger static friction to the weaker sliding friction has to be carried out. The different influences can lead to hesitations in the control behavior which can lead to uncertainties in the case of the required short shutter times.

In order to reduce the friction-dependent disruptions, the head of the push rod is slightly conically tapered.

The surface to be blocked of a cam of the cam plate, of a tooth of the toothed disk or of a side of a catch head is likewise beveled parallel to the cone. These are small angles with respect to the perpendicular with respect to the plane of the leaf carrier. During retraction of the push rod, the surprising effect is then produced that, after the static friction has been overcome, the pivoting movement of the blocked component proceeds in a slightly retarded manner with respect to the retraction of the push rod. The push rod can therefore be retracted completely without contact with the previously blocked component. A reduction in the static friction can be achieved by virtue of the fact that the push rod head is produced from a ceramic material or is provided with a ceramic coating.

Figure 2:
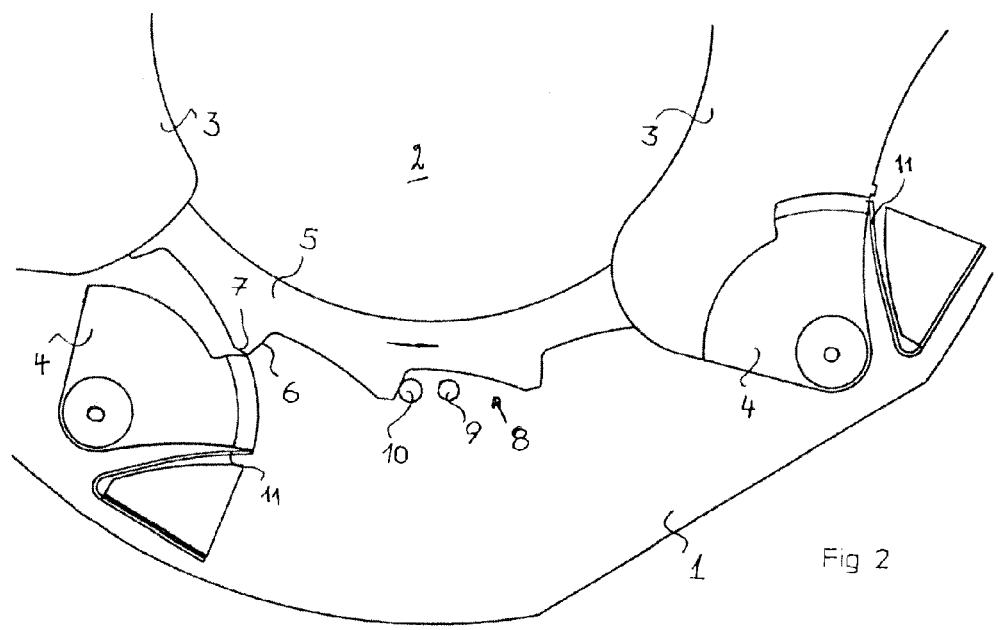
Figure 3:
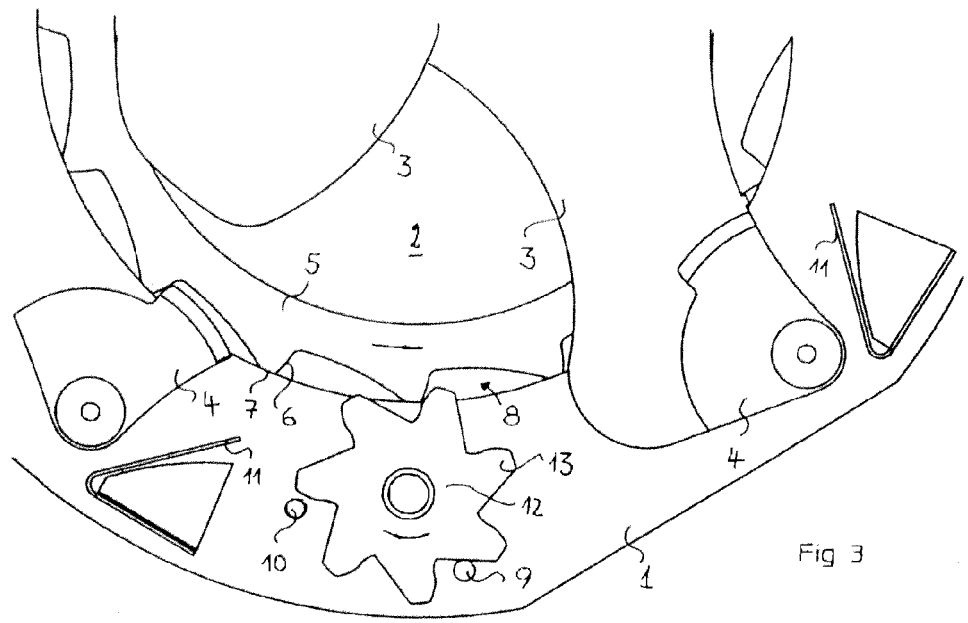
Figure 4:
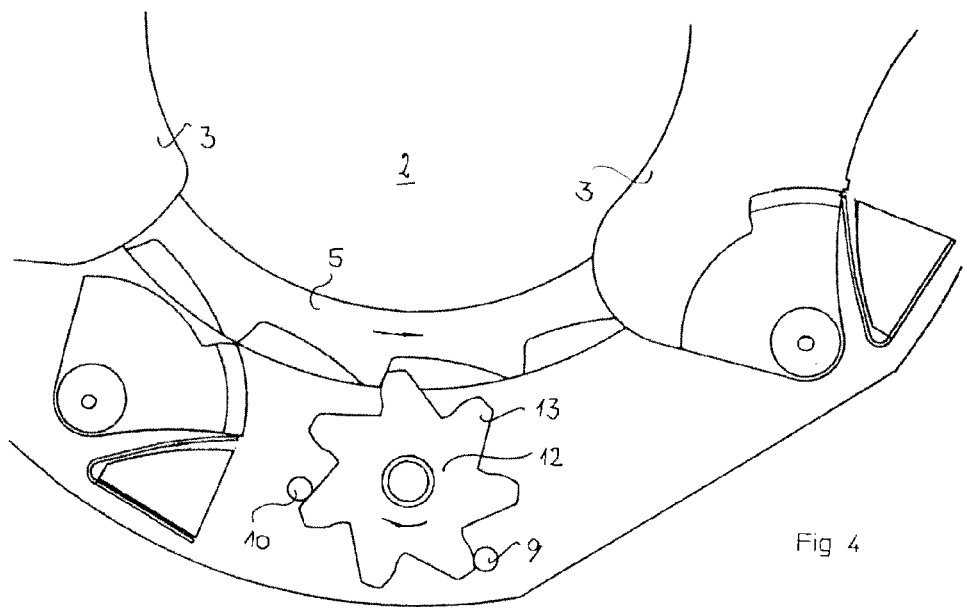
Figure 5:
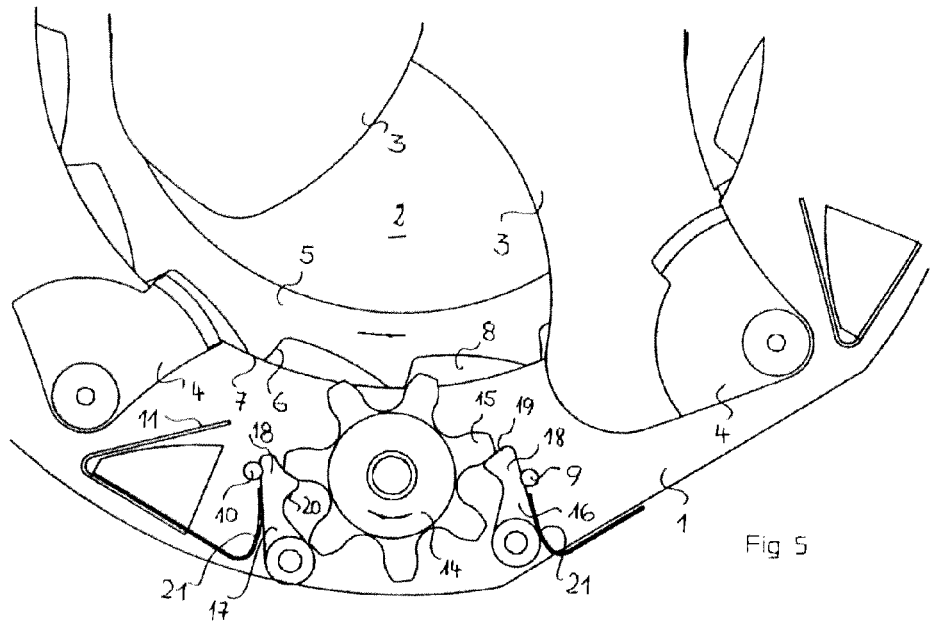
Figure 6:
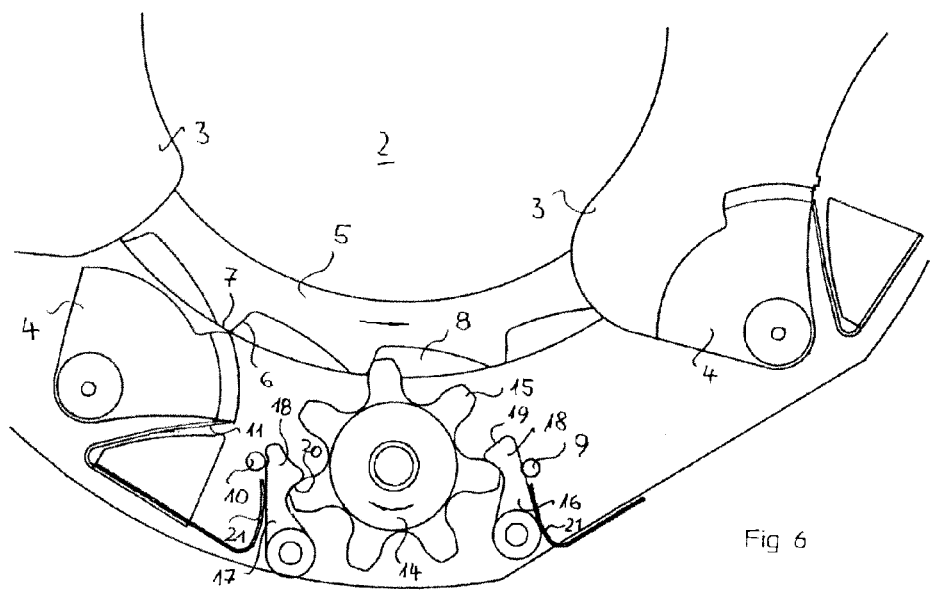
Figure 7:
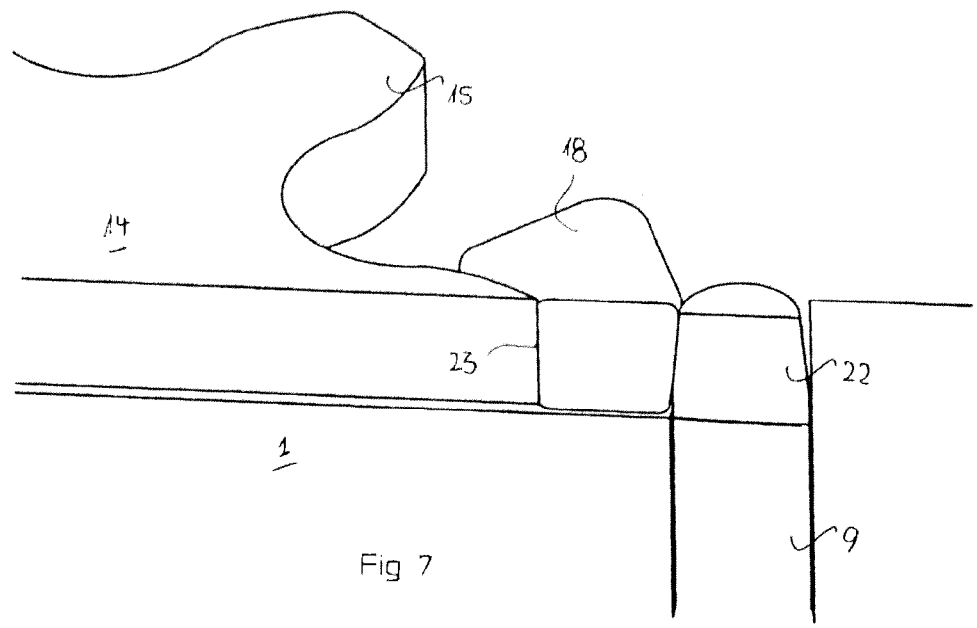
Figure 8:
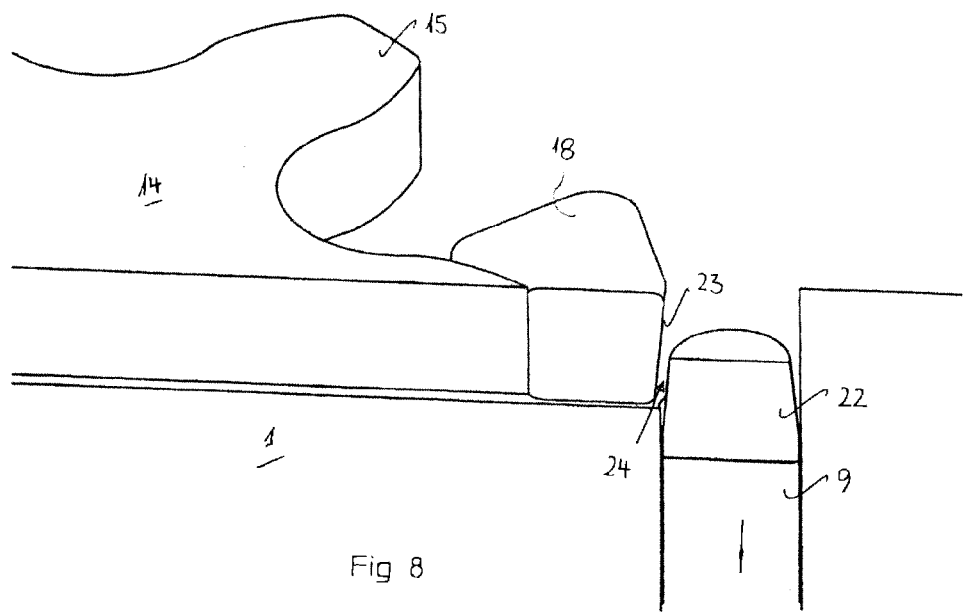

In the drawing, exemplary embodiments of the control device are shown diagrammatically. They will be described in greater detail using the figures, in which:

FIG. 1 shows a push rod in direct engagement with the cam plate, in the closed position of the shutter leaves, FIG. 2 shows the same arrangement as FIG. 1, in the open position of the shutter leaves, FIG. 3 shows a toothed disk in engagement with the cam plate, in the closed position of the shutter leaves, FIG. 4 shows the same arrangement as FIG. 3, in the open position of the shutter leaves, FIG. 5 shows a vane disk with ratchet levers, in the closed position of the shutter leaves, FIG. 6 shows the same arrangement as FIG. 5, in the open position of the shutter leaves, FIG. 7 shows a push rod with a conical push rod head, in the holding position, and FIG. 8 shows the same push rod, in the retracted position.

FIG. 1 shows details of a circularly annular leaf carrier 1. The leaf carrier 1 encloses the shutter opening 2. On the leaf carrier 1, a plurality of shutter leaves 3 are mounted in each case pivotably on a pivoting arm 4. One of the pivoting arms 4 is shown fitted with a shutter leaf 3. Another pivoting arm 4 is shown without shutter leaf 3. In the selected illustration, the shutter leaves 3 collectively cover the shutter opening 2 (closed position).

As actuating device for the pivoting movement of the shutter leaves 3, an annular cam plate 5 is mounted on the leaf carrier 1 concentrically with respect to the shutter opening 2 so as to be rotatable continuously in the arrow direction. In the arrow direction, the cams of the cam plate 5 have a steep actuating flank 6 and, starting from the cam peak 7, a flank which falls in a concavely curved manner to the next actuating flank, with the result that a cam trough 8 is produced between two cam peaks 7 which follow one another.

During the rotation of the cam plate 5 in the arrow direction, the actuating flank 6 drives the pivoting arm 4 with it, as a result of which the shutter leaves 3 are pivoted out of the shutter opening 2.

In order to secure the closed position of the shutter leaves 3, the rotation of the cam plate 5 has to be blocked mechanically in the position which is shown in FIG. 1. To this end, in the leaf carrier 1 there is a first push rod 9, which can be moved perpendicularly with respect to the plane of the cam plate 5, of a solenoid which is attached under the leaf carrier 1. In the extended state, the push rod 9 is positioned in such a way that it directly blocks an actuating flank 6 in the closed position of the shutter leaves 3. The push rod 9 can be mounted in the guide of the solenoid (not shown) under the pressure of a mechanical spring which acts in the axial direction and pushes the push rod 9 into the cam trough 8 in the currentless state of the solenoid, before the actuating flank 6 to be blocked reaches it, in order to avoid perpendicular impact damage. The mechanical ejection of the push rod saves electric energy for the operation of the solenoid.

FIG. 2 shows the same arrangement in the open position of the shutter leaves 3. The push rod 9 is retracted by current being applied to its solenoid, with the result that the cam plate 5 can rotate in the arrow direction under the action of a drive (not shown). As soon as the previously blocked actuating flank 6 has run over the retracted push rod 9, a second similar push rod 10 is pushed into the following cam trough 8. Said second push rod 10 is positioned in such a way that it blocks the following actuating flank 6 when the pivoting arm 4 rests on a cam peak 7. The height of the cam peaks 7 and the length of the pivoting arms 4 are adapted to one another in such a way that, when the upper end of the actuating flank 6 is reached, the shutter leaves 3 which are fastened to the pivoting arm 4 expose the shutter opening 2 (open position).

After retraction of the second push rod 10 and release of the further rotation of the cam plate 5, the pivoting arms 4 run over the respective cam peaks 7 in the direction of the following cam trough 8. The return of the pivoting arms 4 is brought about substantially by a torsion spring which is installed into the pivoting arm 4. In order to overcome possible adhesion when the pivoting arm 4 rests on the cam peak 7, there is additionally a first flat spring 11 which is stressed while the pivoting arm 4 is pivoted out. The control of the shutter is improved as a result.

As soon as the cam which was blocked last has also run over the first push rod 9 which is still retracted, the latter is pushed into the following cam trough 8 again, with the result that the adjacent actuating flank 6 blocks in the closed position upon contact with the push rod 9 of the shutter leaves 3. A shutter cycle is thus ended.

In the exemplary embodiment which is shown in FIG. 3, the cam plate 5 is configured as an annular disk which is mounted in the leaf carrier 1 such that it is flush with the surrounding areas. The cams are configured so as to lie on it in an elevated manner, with the result that the pivoting arms 4 which are arranged pivotably on the leaf carrier 1 can come into engagement with the cams. This construction of the cam plate 5 makes simpler rotary guidance and greater rigidity of the cam plate 5 possible.

Here, the cams are blocked with a toothed disk 12 being connected in between, which toothed disk 12 is mounted on the leaf carrier 1 so as to be freely rotatable and has serrated teeth 13. The steeper flank of the teeth interacts with the actuating flanks 6 of the cams. The shape of the flatter flank is adapted to the formation of the cam troughs 8. The toothed disk 12 can be produced from metal. The flanks of the teeth 13 are only in sliding engagement with the flanks of the cams which are generally produced from a plastic material. Mutual damage is therefore not to be feared.

By extension of the first push rod 9, the rotation of the toothed disk 12 is blocked in a position, in which one of its teeth 13 stops the rotation of the cam plate in a position, in which the pivoting arms 4 have pivoted the shutter leaves 3 into the closed position. The second push rod 10 can likewise be extended in this position, since it does not impede the rotation of the toothed disk 12 in the arrow direction. After the retraction of the first push rod 9, the toothed disk 12 is rotated further by the cam plate 5 in the arrow direction, until a tooth 13 comes into contact with the second push rod 10. The first push rod 9 can already be extended again in this position. The shutter is located in the open position (FIG. 4).

In this exemplary embodiment, the two push rods 9, 10 lie relatively far apart from one another, as a result of which, the mounting of the solenoids on the leaf carrier 1 is facilitated. The arrangement of the push rods 9, 10 in different tooth gaps simplifies the temporal control of the push rods 9, 10, since the respectively non-blocking push rod can already be moved into the standby position before the retraction of the blocking push rod.

One development of the above-described blocking system is shown in FIG. 5. Here, a vane disk 14 with symmetrically shaped vanes 15 which are arranged on its circumference and are spaced apart from one another is in operative connection with the cams of a cam plate 5. In this case, the vanes 15 are not blocked directly via first and second switchable push rods 9, 10, but rather via pivotably mounted, single-arm first and second ratchet levers 16, 17. The ratchet levers 16, 17 in each case have a catch head 18 with an end 19 and a chin 20. The ratchet levers 16, 17 are pressed in the direction of the vane disk 14 via second flat springs 21 and can also be pressed away from the vane disk 14 via the vanes 15, counter to the flat springs 21. In this direction, however, the ratchet levers 16, 17 can be blocked by first and second push rods 9, 10.

In the closed position (shown in FIG. 5) of the shutter leaves 3, the cam plate 5 has pressed the vane disk 14 against the end 19 of the catch head 18 on the ratchet lever 16. The first push rod 9 is extended and therefore prevents the ratchet lever 16 being pressed further to the outside under the pressure of the vane 15. The vane disk 14 which is blocked by contact of a vane 15 with the end 19 of the ratchet lever 16 blocks the cam disk 5 via a further vane 15 and holds the pivoting arms 4 in the closed position of the shutter leaves 3.

The second ratchet lever 17 is likewise blocked in its position against further pivoting out by the second push rod 10, but does not impede the rotatability of the vane disk 14 in its arrow direction. After the retraction of the first push rod 9, the cam plate 5 rotates the vane disk 14. Here, the vane 15 which bears against the end 19 of the ratchet lever 16 slides along the end 19 and presses the ratchet lever 16 to the outside counter to the action of the flat spring 21. At the same time, another vane 15 runs against the chin 20 on the second ratchet lever 17 and therefore blocks the further rotation of the vane disk 14 and the cam plate 5 in the open position of the shutter leaves 3 (FIG. 6).

The catch head 18 of the ratchet lever 16 is pressed again into a gap between the vanes 15 under the action of the flat spring 21 and can be fixed in this position by extension of the first push rod 9. After retraction of the second push rod 10, the vane 15 which bears against the chin 20 of the ratchet lever 17 slides along the chin 20 and presses the ratchet lever 17 to the outside until another vane 15 again bears against the end 19 of the ratchet lever 16 and the state as in FIG. 5 is reestablished.

The pressing forces which are to be overcome when pressing out the ratchet levers 16, 17 are stepped down by lever length of the ratchet levers 16, 17, with the result that considerably more rapid release times are possible between the boundary positions of the shutter leaves 3.

The holding forces of the push rods 9, 10 on the ratchet levers 16, 17 are likewise stepped down correspondingly, with the result that the electric energy to he applied for the retraction of the push rods 9, 10 is reduced in the solenoids.

In order to reduce the friction-dependent forces between the push rods 9, 10 and the components 5, 12, 18 which are to be blocked directly, it is advantageous to configure the push rod heads 22 in a conically tapered manner, as is shown in FIGS. 7, 8 using the example of the ratchet lever blocking. In a manner which is adapted to this, that face 23 on the component 18 to be blocked which interacts with the push rod head 22 is also sloped. In addition, the push rod head 22 can be ceramically coated or can be configured as an attached ceramic cone.

During retraction of the push rod 9, it is then to be observed that, after the static friction is overcome between the push rod head 22 and the face 23 of the component 18, an air gap 24 with respect to the push rod head 22 is formed, which air gap 24 allows a considerably accelerated retraction of the push rod 9.

List of Designations

1 Leaf carrier
2 Shutter opening
3 Shutter leaf
4 Pivoting arm
5 Cam plate
6 Steep actuating flank
7 Cam peak
8 Cam trough
9 First push rod
10 Second push rod
11 First flat spring
12 Toothed disk
13 Tooth
14 Vane disk
15 Vane
16 First ratchet lever
17 Second ratchet lever
18 Catch head
19 End of the catch head
20 Chin of the catch head
21 Second flat spring
22 Push rod head, conical
23 Component face, sloped
24 Air gap

The invention claimed is:

1. A device for controlling a central shutter, in which a plurality of shutter leaves (3) are mounted on a circularly annular leaf carrier (1) such that they can be pivoted on a pivoting arm (4), and in which, as actuating device for the pivoting movement of the shutter leaves (3), an annular cam plate (5) is mounted on the leaf carrier (1) concentrically with respect to the shutter opening (2), such that it can be rotated continuously in one direction, it being possible for the rotation of the cam plate (5) to be blocked by mechanical engagement into a cam trough (8) in front of an actuating flank (6) of a cam, characterized in that, for mechanical blocking purposes, there is a push rod (9, 10) of a solenoid, which push rod (9, 10) can be moved perpendicularly with respect to the plane of the cam plate (5).

2. The device as claimed in claim 1, characterized in that the push rod (9, 10) is assigned a mechanical spring which is mounted in the solenoid, acts in the axial direction and, when current is applied to the solenoid, can be stressed by retraction of the push rod (9, 10).

3. The device as claimed in claim 2, characterized in that there are two solenoids which are positioned in such a way that their push rods (9, 10) block either an actuating flank (6) of the cams in the open position of the shutter leaves (3) or in the closed position of the shutter leaves (3).

4. The device as claimed in claim 1, characterized in that a toothed disk (12) which is in engagement with the cam plate (5) and can be driven by the latter is mounted rotatably on the leaf carrier (1), the teeth (13) of which toothed disk (12) have, in the rotational direction, a tooth flank which corresponds to the actuating flank (6) of a cam of the cam plate (5) and a shape which is adapted to a cam trough (8), the solenoid being positioned for blocking the toothed disk (12).

5. The device as claimed in claim 4, characterized in that there are two solenoids which are positioned in such a way that their push rods (9, 10) block either a tooth flank in the open position of the shutter leaves (3) or in the closed position of the shutter leaves (3).

6. The device as claimed in claim 1, characterized in that a vane disk (14) which is in engagement with the cam plate (5) and can be driven by the latter is mounted rotatably on the leaf carrier (1), with vanes (15) which are arranged on the circumference of said vane disk (14), are spaced apart from one another, are shaped symmetrically and can be blocked with the aid of a solenoid.

7. The device as claimed in claim 6, characterized in that a single-arm ratchet lever (16, 17) is mounted pivotably on the leaf carrier (1), which ratchet lever (16, 17) has a catch head (18) which can be brought into contact with a vane (15) of the vane disk (14).

8. The device as claimed in claim 7, characterized in that the ratchet lever (16, 17) is coupled to a second flat spring (21) in such a way that the catch head (18) can be pivoted against the vane disk (14).

9. The device as claimed in claim 8, characterized in that the ratchet lever (16, 17) can be blocked by the push rod (9, 10) of a solenoid in a position in which it is pivoted in with the catch head (18) between the vanes (15).

10. The device as claimed in claim 9, characterized in that two ratchet levers (16, 17) are provided which can be blocked in each case in a pivoting position, in which either the end (19) of the catch head (18) blocks a vane (15) in the position, in which the vane (15) which is in engagement with the cam plate (5) holds the latter in the closed position of the shutter leaves (3), or in which the chin (20) of the catch head (18) blocks a vane (15) in the position, in which the vane (15) which is in engagement with the cam plate (5) holds the latter in the open position of the shutter leaves (3).

11. The device as claimed in claim 1, characterized in that the push rod head (22) is conically tapered.

12. The device as claimed in claim 1, characterized in that the push rod head (22) is equipped with a ceramic surface.

13. The device as claimed in claim 11, characterized in that that face (23) of the component (5, 12, 18) to be blocked which interacts with the push rod head (22) has a slope parallel to the conical taper of the push rod head (22).

* * * * *